(12) United States Patent
Matsuda et al.

(10) Patent No.: US 7,766,405 B2
(45) Date of Patent: Aug. 3, 2010

(54) ROBOT HAND APPARATUS

(75) Inventors: Hiroshi Matsuda, Saitama (JP);
Takafumi Fukushima, Saitama (JP);
Kenichiro Sugiyama, Saitama (JP);
Masayoshi Kokushiyou, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1130 days.

(21) Appl. No.: 10/576,347

(22) PCT Filed: Sep. 29, 2005

(86) PCT No.: PCT/JP2005/017973

§ 371 (c)(1),
(2), (4) Date: Apr. 18, 2006

(87) PCT Pub. No.: WO2006/064602

PCT Pub. Date: Jun. 22, 2006

(65) Prior Publication Data

US 2009/0015026 A1    Jan. 15, 2009

(30) Foreign Application Priority Data

Dec. 14, 2004   (JP) .............................. 2004-361025

(51) Int. Cl.
*B25J 15/08*   (2006.01)
(52) U.S. Cl. ........................................ 294/106; 901/31

(58) Field of Classification Search ................. 294/106, 294/111; 901/31, 36, 39; 623/24
See application file for complete search history.

(56) References Cited

U.S. PATENT DOCUMENTS

| 7,222,904 B2 * | 5/2007 | Matsuda ...................... 294/111 |
| 2007/0018470 A1 * | 1/2007 | Hayakawa et al. .......... 294/106 |

FOREIGN PATENT DOCUMENTS

| EP | 1 457 294 A1 | 9/2004 |
| JP | 11-156778 | 6/1999 |
| JP | 2001-277175 | 10/2001 |
| JP | 2001-347482 | 12/2001 |
| JP | 2002-103269 | 4/2002 |
| JP | 2003-117873 | 4/2003 |
| JP | 2003-181787 | 7/2003 |
| JP | 2003-266357 | 9/2003 |

* cited by examiner

*Primary Examiner*—Paul T Chin
(74) *Attorney, Agent, or Firm*—Squire, Sanders & Dempsey L.L.P.

(57) ABSTRACT

A robot hand apparatus (1) includes four of finger mechanisms (20) each elongates from a base (10), a motor (30) actuating each finger mechanism (20), four of rotation rollers (50) each connects with corresponding finger mechanism (20) for actuating each finger mechanism (20), and a power transmission mechanism (60) transmitting a power from the motor (30) to each rotation roller (50) at different timing.

9 Claims, 7 Drawing Sheets

ROBOT HAND APPARATUS

CROSS REFERENCE TO RELATED APPLICATIONS

The present invention claims priority under 35 U.S.C. §119 to Japanese Patent Application No. 2004-361025, filed on Dec. 14, 2004. This application is a U.S. national stage application filed under 35 U.S.C. §371 based on International Patent Application No. PCT/JP2005/017973, filed on Sep. 29, 2005.

FIELD OF THE INVENTION

The present invention relates to a robot hand apparatus having a plurality of finger mechanisms.

BACKGROUND OF THE INVENTION

Recently, a robot hand apparatus having a plurality of fingers mimicking a hand of a human has been known.

This kind of robot hand apparatus comprises a palm section, which corresponds to a palm of a hand, and a plurality of finger mechanisms each elongates from the palm section. In each finger mechanism, a plurality of phalange parts is pivotably joined each other through a finger joint, and serves as a link mechanism which flexes or stretches the phalange part of a palm section side (base-end side) by motor power, so that the phalange parts next to the phalange part of the palm section side are flexed or stretched one by one.

An example of the conventional robot hand apparatus will be explained below with two examples.

As first example of conventional robot hand apparatus, the robot hand apparatus disclosed in Japanese unexamined patent publication JP No. 2003-266357 has been known. In this apparatus, each finger mechanism is respectively provided with a single motor and can be flexed by the individually provided motor. Therefore, a humanlike grip motion, i.e. the motion to flex each finger one by one from a little finger (little) can be achieved.

As second example of conventional robot hand apparatus, the robot hand apparatuses disclosed in Japanese unexamined patent publication JP No. 2002-103269 and JP No. 2003-181787 have been known.

In this conventional robot hand apparatus, each finger mechanism respectively connects with a corresponding wiring at base-side end thereof, and the other end of each wiring connects with the same motor through a plurality of members. Thus, since only one motor is required for actuating each finger mechanism, this allows the improvement of the space efficiency.

However, in the robot hand apparatus of first example, the humanlike grip motion (a regular grip motion) can be achieved, but the space efficiency (saving of a space) becomes worse due to a plurality of motors installed for actuating respective finger mechanisms.

In the robot hand apparatus of second example, on the other hand, since the number of the motor to be installed is only one, the space efficiency can be improved. However, a humanlike grip motion cannot be achieved. This is because respective finger mechanisms are simultaneously flexed by the single motor.

In the robot hand apparatus of second example, furthermore, when gripping an object having a complicated shape, for example, the motor cannot pull the wiring any more if any one of five finger mechanisms comes in contact with the object. In this case, since the others of five finger mechanisms cannot come in contact with the object, the sufficient grip of the object cannot be achieved.

Therefore, the robot hand apparatus, which can improve the space efficiency and provide a humanlike grip motion, i.e. the motion flexing sequentially fingers from a little, has been mainly required.

SUMMARY OF THE INVENTION

The present invention relates to a robot hand apparatus which includes a plurality of finger mechanisms each elongates from a base and a power source for actuating each of finger mechanisms. This robot hand apparatus further includes a plurality of finger mechanism actuation units for actuating each of the finger mechanism and a power transmission mechanism for transmitting a power from the power source to at least two of said plurality of finger mechanisms at different timing.

According to this construction, each of finger mechanisms is actuated at a predetermined different timing, by establishing so that a power is transferred to each of the finger mechanisms at a different timing. Thereby, the motion to flex a plurality of finger mechanism one by one from an end can be achieved. That is, a humanlike grip motion, i.e. the motion to flex each finger one by one from a little finger (little) can be achieved.

Additionally, in this construction, the power transmission mechanism can suitably transmit a power from a single power source to each of finger mechanisms at different timing. Therefore, an additional power source is not required and this allows the improvement of the space efficiency.

In the robot hand apparatus, additionally, it is preferable that the power source is a motor, and the finger mechanism actuation unit is a rotation roller which connects with the finger mechanism through a transmission unit.

Here, the power transmission mechanism includes; a rotation axis which supports each rotation roller while allowing the rotation around the rotation axis of the rotation roller and which is adapted to be rotated by the motor; and elastic devices each is fixed to the rotation axis for holding the rotation roller at a predetermined position on the rotation axis.

Additionally, it is preferable that each rotation roller rotates together with the rotation axis when the rotation roller is held by the elastic device at a predetermined position on the rotation axis, and that the degree of the deformation of each of elastic devices differs each other when the finger mechanism is in a maximum grip state or in a maximum stretch state.

Here, "maximum grip state" is the condition where further flexing of the finger mechanism cannot be achieved by the actuation of the finger mechanism, and "maximum stretch state" is the condition where further stretching of the finger mechanism cannot be achieved by the actuation of the finger mechanism.

According to this construction, if it is established that the degree of the deformation of each of elastic devices differs each other under the condition where the finger mechanism is in a maximum stretch state, each rotation roller begins to rotate together with the rotation axis in order from the rotation roller, in which the degree of the deformation of the elastic device became the same as at the time of holding the rotation roller to a predetermined position on the rotation axis, when the rotation axis is rotated by the actuation of the motor for starting the flexing of the finger mechanism from a maximum stretch state.

That is, when increasing in order the degree of the deformation of a plurality of elastic devices from the end, e.g. from a little finger side (little side), a humanlike grip motion, i.e. the motion to flex each finger one by one from a little finger (little) can be achieved.

In this construction, additionally, since the rotation axis, which does not shift to the other space, and the elastic device, which is provided on the rotation axis, are adopted as power transmission mechanism, which transmits a power to a plurality of finger mechanism at a predetermined timing, this allows the improvement of the space efficiency.

Furthermore, it is preferable that the transmission unit is a link mechanism. According to this construction, when stretching the finger mechanism, the base-side member of the finger mechanism can be aggressively pushed by the link mechanism than the mechanism, in which the flexing and stretching of the finger mechanism is achieved by changing the pulling direction of the wiring being put around the part of the finger mechanism. Thereby, the flexing and stretching of the finger mechanism can be achieved sufficiently.

Especially, in the case of the conventional construction, in which a spring for pushing the finger mechanism in a direction to stretch the finger mechanism is installed, the deformation of the spring becomes a loss with respect to a grip force when flexing the finger mechanism. In the case of mechanism of the present invention that pushes and pulls the finger mechanism by the link-mechanism, on the other hand, such problem does not arise.

Still furthermore, it is preferable that a plurality of contact-parts each engages with and separates from a part of the corresponding rotation roller are provided on the rotation axis.

According to this construction, when grasping a comparatively heavy member (target object) put on the finger mechanism, for example, the rotation roller held by the spring member tries to rotate together with the rotation axis, when the rotation axis begins to rotate by the actuation of the motor. In this case, since the flexing motion of the finger mechanism is disturbed by the target object, the rotation axis rotates while deforming the spring member, without rotating the rotation roller.

That is, since the rotation axis causes a relative rotation with respect to the rotation roller, the contact-parts disposed on the rotation axis begins to approach a part of the rotation roller as the rotation proceeds. Then, since the rotation roller is pushed by the contact-parts with a strong force when the contact-parts contacts with a part of the rotation roller, the gripping of the target object can be achieved even if the target object is a comparatively heavy member.

Additionally, it is preferable that each finger mechanism is supported while allowing the turn in an approaching-and-separating direction with regard to the adjoining finger mechanism around base-side section of the finger mechanism.

According to this construction, when robot hand apparatus shakes a hand with a person, since each finger mechanism is pivotable, the occurrence of the breakage of each finger mechanism can be prevented, even if a person grabs with strong force so that four finger mechanisms (index, middle, ring, litter) are contacted each other.

Furthermore, it is preferable that each finger mechanism is held by the elastic device fixed to the base so that the finger mechanism is pushed by the elastic device in a direction apart from the adjoining finger mechanism.

According to this construction, each finger mechanism can be moved automatically to the home position, after finishing a shake hand between the person and the robot hand apparatus.

According to the present invention, a power from a single power source can be transferred to each finger mechanism actuation units at a different timing. This allows the improvement in the space efficiency and allows to achieve a humanlike grip motion, i.e. the motion to flex each finger one by one from a little finger (little) can be achieved.

DETAILED DESCRIPTION OF THE PREFERRED EMBODIMENT

Next, the preferred embodiment of the present invention will be explained with reference to attached drawings. In this embodiment, the case where the present invention is applied for four finger mechanisms among the finger mechanism of a robot hand apparatus mimicking a hand of a human will be explained as an example.

Figure 1:
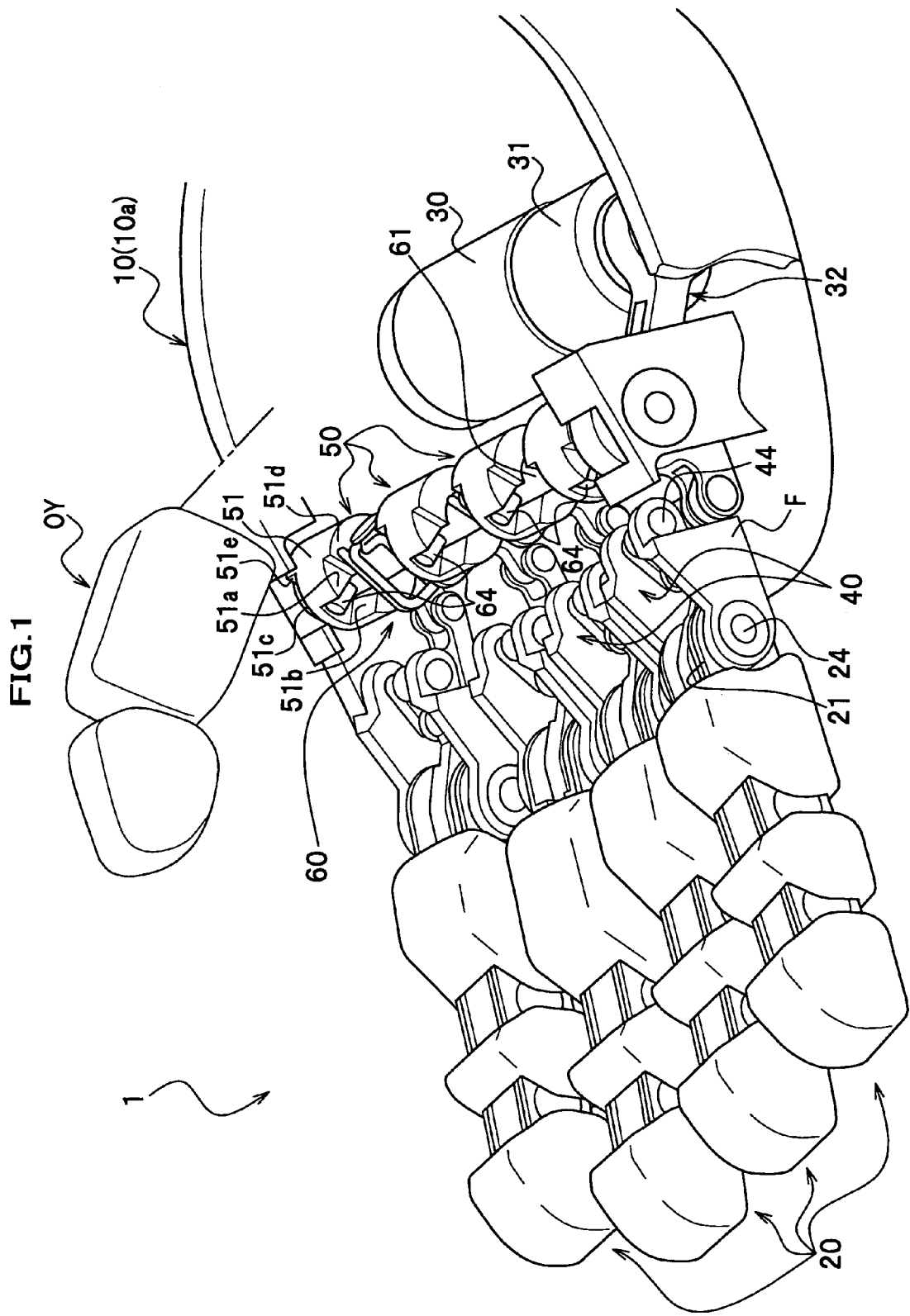
FIG. 1 is a perspective view showing the robot hand apparatus of the present embodiment.

As shown in FIG. 1, a robot hand apparatus 1 consists essentially of a base 10, four finger mechanisms 20, a thumb structure OY, and a motor 30 (power source). Here, the base 10 corresponds to a part of the hand of a human, i.e. a palm and opisthenar of a human. Each of four finger mechanisms 20 elongates in almost the same direction from the end of the base 10 and is adapted to be actuated by the motor 30. The thumb structure OY elongates from the different portion with respect to finger mechanisms 20 of the base 10.

Furthermore, this robot hand apparatus 1 is provided with four rotation rollers 50 (finger mechanism actuation unit) and a power transmission mechanism 60. Each of four rotation roller 50 connects with corresponding finger mechanism 20 through a link mechanism 40 (transmission unit) for actuating the finger mechanism 20, and the power transmission mechanism 60 is adapted to transmit power from the motor 30 to each rotation roller 50, at a different timing.

Here, the thumb structure OY is adapted to be actuated by a motor (not shown) other than the motor 30. In this embodiment, the power from the motor 30 is not transferred to the thumb structure OY, i.e. the thumb structure OY does not correspond to the finger mechanism. But, the present invention is not limited to the example of this embodiment, the thumb structure may be actuated together with other finger mechanism using the same power source to be used for the actuation of the finger mechanism.

The base 10 comprises a palm section (not shown), which has a case-like shape to shape the palm of a human's hand, and an opisthenar section 10a, which has a case-like shape to shape the palm of a human's hand. In this embodiment, the space formed by combining the palm section with the opisthenar section 10a stores therein the motor 30, the link mechanism 40, the rotation roller 50, and the power transmission mechanism 60.

Figure 2A:
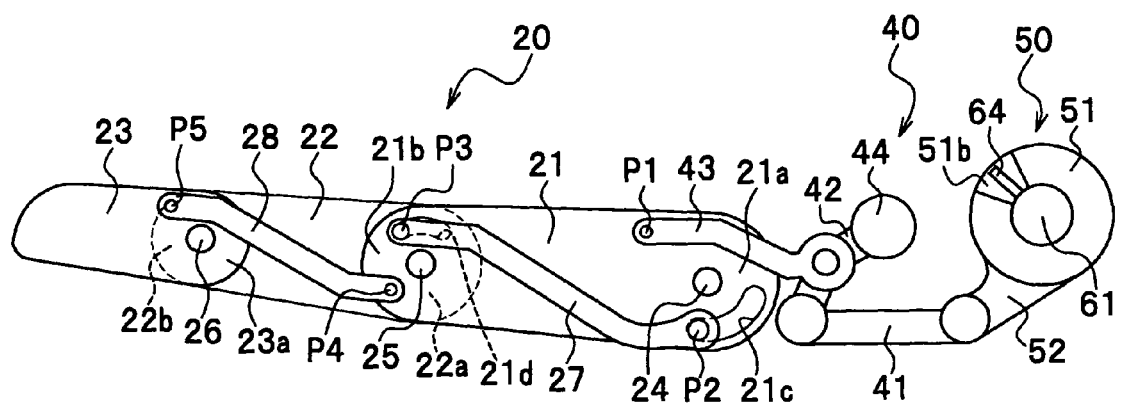
FIG. 2A is a side view showing the state of the finger mechanism and link mechanism when the finger mechanism is being stretched.

The finger mechanism 20, as shown in FIG. 2A, essentially consists of three interphalangeal members 21, 22, and 23, joint members 24, 25, and 26, and link-arms 27 and 28.

Here, the joint member 24 connects the interphalangeal member 21, which is positioned in a base-side (in the vicinity of the base 10), with a frame F (see FIG. 1) fixed to the base 10, while allowing the turn around the joint member 24. The joint member 25 connects interphalangeal members 21 and 22 each other while allowing the turn around the joint member 25, and the joint member 26 connects interphalangeal members 22 and 23 each other while allowing the turn around the joint member 26.

The link-arm 27 and 28 sequentially actuate the interphalangeal members 22 and 23, which are positioned next to the interphalangeal member 21, in compliance with the actuation of the interphalangeal member 21.

In the following explanation, expediently, each of three interphalangeal members 21, 22, and 23 is also denoted from base-side as a base-side member 21, an intermediate member 22, and a fingertip member 23. Additionally, each of three joint members 24, 25, and 26 is denoted from base-side as a third joint member 24, a second joint member 25, and a first joint member 26. Furthermore, each of two link-arms 27 and 28 is denoted from base-side as a first link-arm 27 and a second link-arm 28.

In the following explanation, additionally, the explanation is given only to the finger mechanism 20 for a little finger (little), and the explanation about other finger mechanism 20 for an index finger (index), a middle finger (middle), and a ring finger (ring) will be omitted. This is because the finger mechanism 20 for an index, a middle, and a ring is only different in size from the finger mechanism 20 for a little.

The base-side member 21 is a member whose shape is a rectangular shape with semicircle shape at both ends thereof. The base-side member 21 connects, at the base end 21a thereof, with the third joint member 24 fixed to the frame F (see FIG. 1), and is turnable with respect to the third joint member 24. Also, the base-side member 21 connects, at tip 21b thereof, with the intermediate member 22 through the second joint member 25, and is turnable with respect to the intermediate member 22.

The link mechanism 40 connects with the base-side member 21 through a pin P1, while allowing the turn around the pin P1 of the link mechanism 40. The position where the link mechanism 40 is connected to is a suitable position on palm-side (upper side in figure) in the vicinity of the third joint member 24 of the base-side member 21. The base-side member 21 is provided with slots 21c and 21d at both ends thereof in order to avoid the contact with pin P2 and P3, each of which turnably connects with the link-arm 27.

Furthermore, the second link-arm 28 connects with the base-side member 21 through a pin P4, while allowing the turn around the pin P4. The position where the second link-arm 28 is connected to is a suitable position on the opisthenar-side (bottom side in figure) of the tip 21b.

The intermediate member 22 is a member whose shape is almost the same as the shape of the base-side member 21. The intermediate member 22 connects, at base end 22a thereof, with the base-side member 21 through the second joint member 25, while allowing the turn around the second joint member 25. The intermediate member 22 connects, at tip 22b thereof, with the fingertip member 23 through the first joint member 26, while allowing the turn around the first joint member 26.

Additionally, the first link-arm 27 connects with the intermediate member 22 through the pin P3, while allowing the turn around the pin P3. The position where the first link-arm 27 is connected to is a suitable position on palm-side in the vicinity of the second joint member 25, i.e. a suitable position on palm-side between the first joint member 26 and the second joint member 25.

The fingertip member 23 is a member whose outer shape is almost the same as the shape of the base-side member 21. The fingertip member 23 connects, at base end 23a thereof, with the intermediate member 22 through the first joint member 26, while allowing the turn around the first joint member 26.

Additionally, the second link-arm 28 connects with the fingertip member 23 through a pin P5, while allowing the turn around the pin P5. The position where the second link-arm 28 is connected to is a suitable position on palm-side in the vicinity of the first joint member 26, i.e. a suitable position on a palm-side between the tip of the fingertip member 23 and the first joint member 26.

The first link-arm 27 is a member turnably connects with the frame F (see FIG. 1) and the intermediate member 22.

Figure 2B:
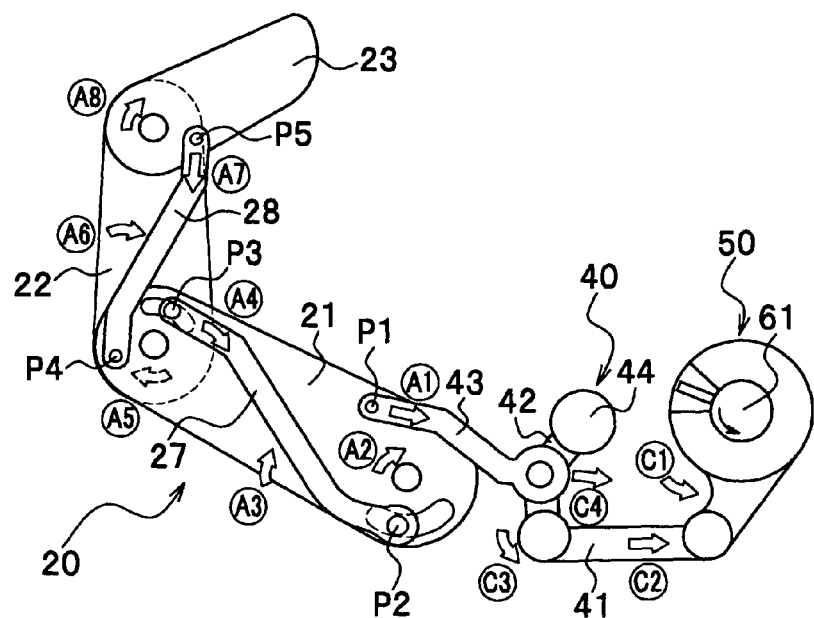
FIG. 2B is a side view showing the state of the finger mechanism and link mechanism when the finger mechanism is being bent.

Referring to FIG. 2B, the base-side member 21 is turned in a direction shown by arrow A2, when the base-side member 21 is pulled in a direction shown by arrow A1 by the link mechanism 40. Thereby, since the first link-arm 27 is turned around the pin P2 in a direction shown by arrow A3, the intermediate member 22 is pulled in a direction shown by arrow A4 through the pin P3.

The second link-arm 28 is a member turnably connects with the base-side member 21 and the fingertip member 23. The intermediate member 22 turns in a direction shown by arrow A5, when the intermediate member 22 is pulled, as described above, in a direction shown by arrow A4 by the first link-arm 27. Thereby, since the second link-arm 28 turns in a direction shown by arrow A6 around the pin P4, the fingertip member 23 is pulled in a direction shown by arrow A7 through the pin P5 and thus the fingertip member 23 begin to turn in a direction shown by arrow A8.

When stretching the finger mechanism 20 which is in a flexed state, the finger mechanism is actuated so that the direction of each arrow (A1-A8) becomes reverse.

As shown in FIG. 1, the motor 30 connects with a rotation axis 61 of the power transmission mechanism 60 through a reduction unit 31 and a motor side link mechanism 32.

Figure 3A:
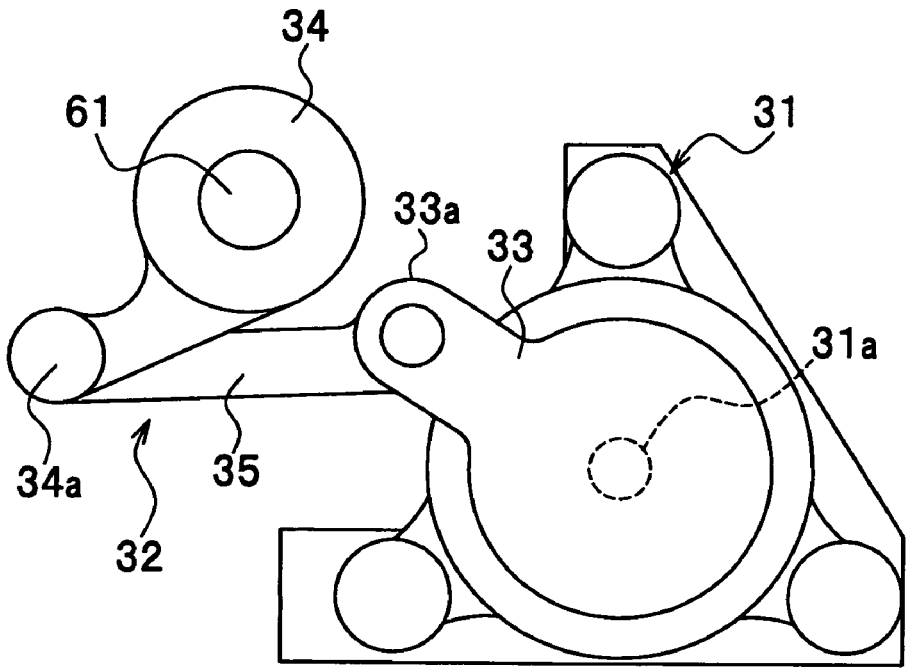
FIG. 3A is a side view showing the link mechanism of motor-side when the finger mechanism is being stretched.

As shown in FIG. 3A, the motor side link mechanism 32 comprises a first rotation arm 33, a second rotation arm 34, and a link-arm 35. The first rotation arm 33 is fixed to an output shaft 31a of the reduction unit 31 and rotates together with the output shaft 31a. The second rotation arm 34 is fixed to a rotation axis 61 and rotates together with the rotation axis 61. The link-arm 35 rotatably connects with an elongated part 33a of the first rotation arm 33 and an elongated part 34a of the second rotation arm 34.

Figure 3B:
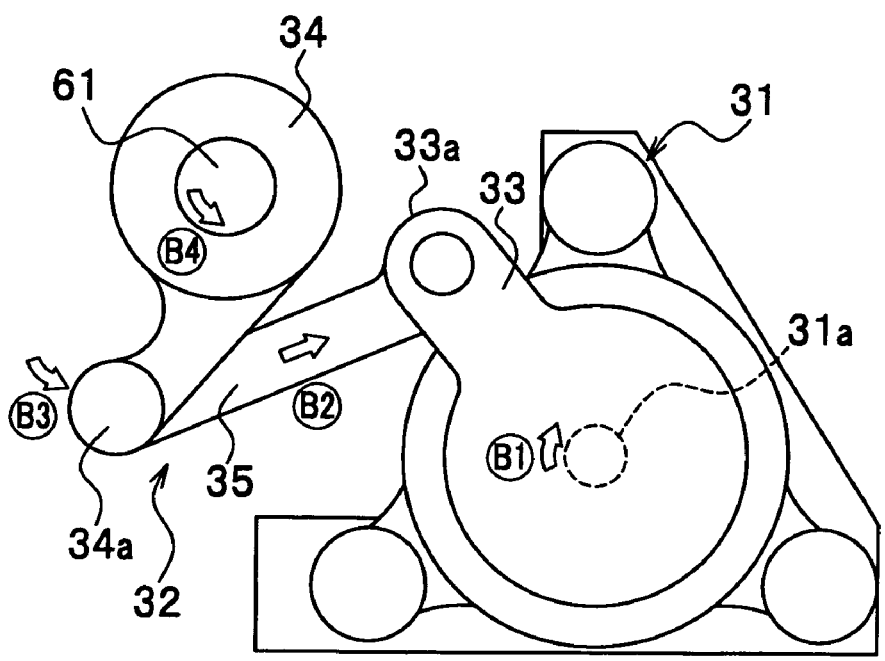
FIG. 3B is a side view showing the link mechanism of motor-side when the finger mechanism is being bent.

Then, in the motor side link mechanism 32, as shown in FIG. 3B, the link-arm 35 and the elongated part 34a of the second rotation arm 34 are respectively pulled in a direction shown by arrow B2 and arrow B3 by the elongated part 33a of the first rotation arm 33, when the output shaft 31a of the reduction unit 31 rotates and the first rotation arm 33 begins to rotate in a direction shown by arrow B1. Thereby, the rotation axis 61 begins to rotate in a direction shown by arrow B4 together with the second rotation arm 34.

Here, the direction of arrow B1 to B4 in the above descried embodiment is a direction at the time of flexing the finger mechanism 20. Thus, the direction, at the time of stretching the finger mechanism 20, is an inverse direction with respect to the direction of arrows B1-B4.

Figure 4:
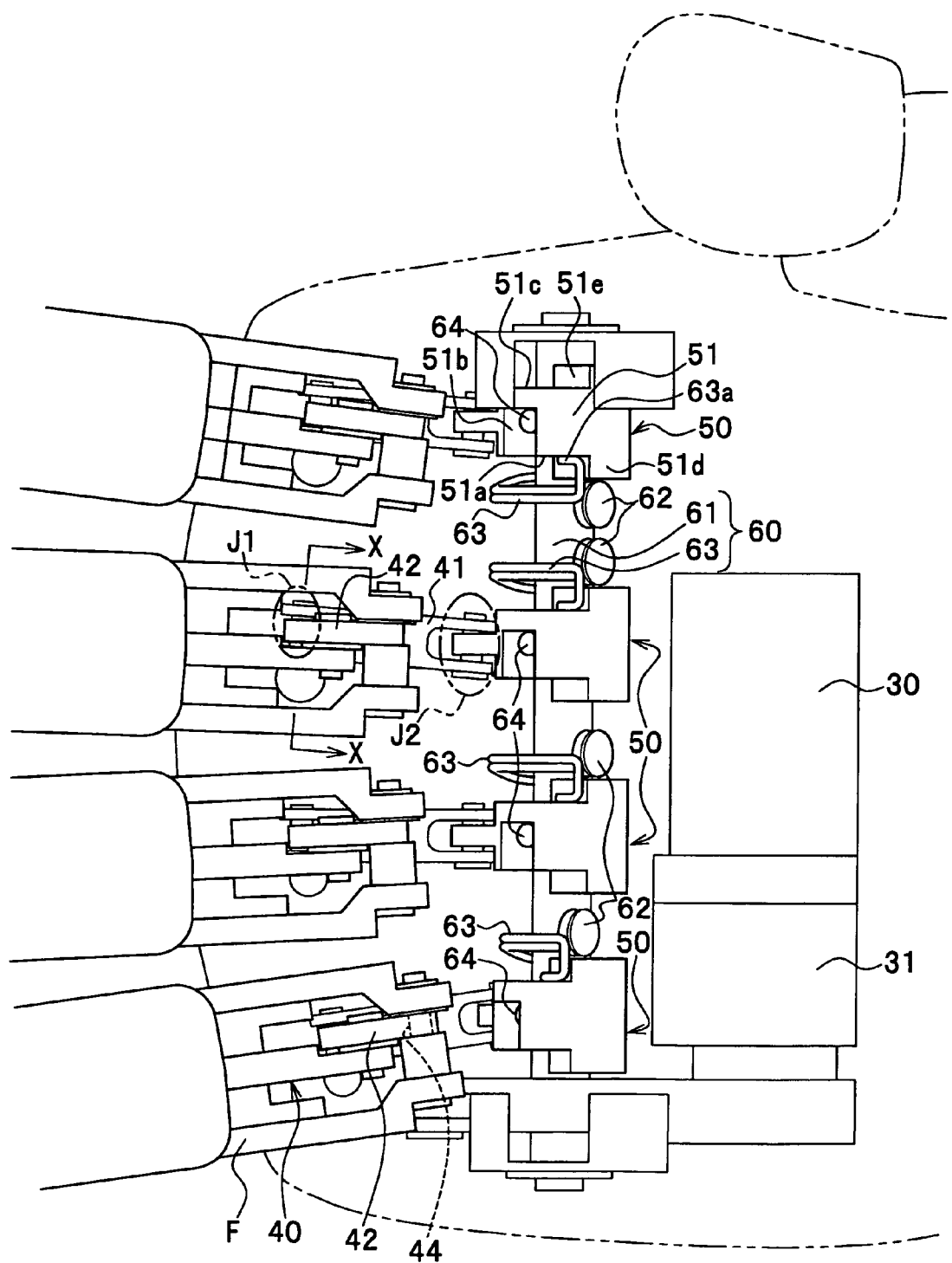
FIG. 4 is a top plane view showing the power transmission mechanism.

As shown in FIG. 1 and FIG. 4, the power transmission mechanism 60 consists essentially of the rotation axis 61 and a spring member 63 fixed to the rotation axis 61 through a fixation pin 62.

The rotation axis 61 holds each of four rotation rollers 50 while allowing the rotation around the rotation axis 61 of each of four rotation rollers 50. A total of four contact pins (contacting part) 64 are disposed on the rotation axis 61 so that each contact pin 64 is allowed to contact with/apart from the corresponding notch 51b formed on the rotation roller 50.

The spring member 63 is a coil-like shaped spring being wound around the rotation axis 61 with a predetermined interval.

The spring member 63 sandwiches a part of the rotation roller 50 by one end 63a and the other end (not shown) thereof, and is fixed by the fixation pin 62 at the center part thereof. Thereby, the spring member 63 sandwiches from both sides the rotation roller 50 to hold the relative position with respect to the rotation axis 61 of the rotation roller 50 at a predetermined position.

In this embodiment, the pressure to be given by the spring member 63 is established at a certain level. Therefore, the rotation axis 61 and the rotation roller 50 is turned simultaneously without causing a deformation to the spring member 63, when the rotation axis 61 is turned without applying a load to the finger mechanism 20. Additionally, the rotation axis 61 relatively turns with respect to the fixed rotation roller 50 with causing a deformation to the spring member 63, when the rotation axis 61 is turned while restricting the actuation of the finger mechanism 20 by a load.

Additionally, the installation position (arrangement) of each fixation pin 62 is shifted each other along the periphery of the rotation axis 61. Thereby, the degree of deformation of the finger mechanism 20 at the time of maximum grip state and that of at the time of maximum stretch state differ each other (see FIG. 5).

Next, the function of the power transmission mechanism 60 will be explained with reference to FIG. 5, which schematically indicates the relation between the rotation roller 50, the spring member 63, and the rotation axis 61. In this figure, expediently, it is indicated that the spring member 63 consists of two spring members 63'.

Figure 5:
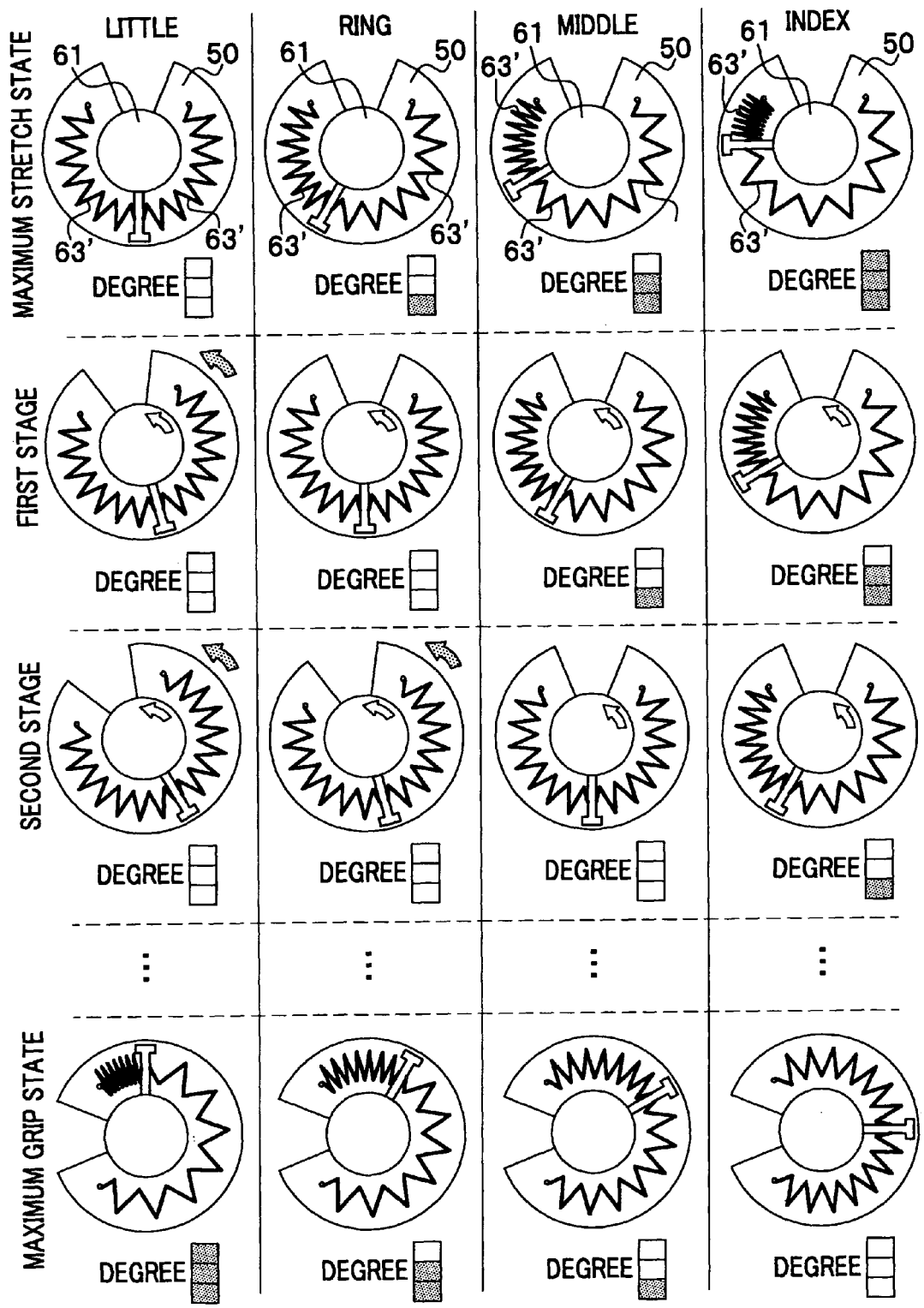
FIG. 5 is an explanatory view showing the relation between the rotation roller and the spring member.

As shown in FIG. 5, if all of four finger mechanisms 20 are maximum stretch state, the degree of the deformation of the spring member 63' of the little side is zero, i.e. the pressure to be given by two spring members 63' is canceled each other. The degree of the deformation of other spring member 63' increases stepwise in order of a ring, a middle, and an index.

Then, if the rotation axis 61 rotates in an anticlockwise direction from this state, only the rotation axis 61 of a little side, whose degree of deformation of the spring member 63' is zero, rotates together with the rotation roller 50. The rotation axis 61 of others provides a relative rotation with respect to the rotation roller 50, to change the deformation of the spring member 63' to the non-deformed condition (first stage in figure). This is because the rotation of the rotation rollers 50 of others is restricted by the load given by the deformation of the spring member 63'.

Next, as shown in the first stage of figure, when the deformation of the spring member 63' for a ring backs to the non-deformed condition by the rotation of the rotation axis 61, i.e. when the degree of the deformation becomes zero, the rotation roller 50 for a ring begins to rotate together with the rotation axis 61 (second stage of figure).

Then, each rotation roller 50 of finger begins to rotate together with the rotation axis 61 in order of a middle and an index.

That is, by establishing so that the degree of the deformation of spring member 63' increases stepwise from a little to an index, the timing of the start of the rotation of each rotation roller 50 can be controlled so that the rotation of each rotation roller 50 begins sequentially from a little to an index. Thereby, it is possible to flex the finger mechanism 20 sequentially from a little side.

Here, respective finger mechanisms 20 sequentially become the maximum grip state, i.e. the state where the finger mechanism cannot bend any more, from the finger mechanism 20 of a little to the finger mechanism 20 of an index, when respective finger mechanisms 20 are sequentially bent from the finger mechanism of a little to the finger mechanism of an index. Thereby, the rotation of the rotation roller 50 is forbidden sequentially from the rotation roller 50 of a little to the rotation roller 50 of an index.

Then, the rotation roller 50, which has been rotating together with the rotation roller 50, begins the relative rotation with respect to the rotation roller 50 sequentially from the rotation roller of a little, when the rotation of the rotation roller 50 is forbidden sequentially from a little side.

Thereby, since each spring member 63' is sequentially flexed from a little side, the amount of the deformation becomes inverse with respect to the maximum stretch state when all of four finger mechanism 20 becomes a maximum grip state. That is, the amount of the deformation becomes the state in which the degree of the deformation of the spring member 63' increases stepwise from the spring member 63' of an index to the spring member 63' of a little.

Thus, the finger mechanism 20 is sequentially stretched from the finger mechanism 20 of an index side, when stretching each finger mechanism 20 from the maximum grip state.

Next, with reference to FIG. 2A, the explanation of the construction will be given again. As shown in FIG. 2A, the rotation roller 50 has a rotation base 51, which rotatably engages with the rotation axis 61, and an elongation part 52, which elongates outside in a radial direction from the rotation base 51.

As shown in FIG. 1, a notch 51b is formed on one side 51a of the rotation base 51. The notch opens in an axial direction (one side 51a direction) and penetrates in a radial direction.

The notch 51b is adapted to contact with/apart from the contact pin 64 fixed to the rotation axis 61. Thereby, the relative displacement with respect to the rotation axis 61 of the rotation roller 50 is controlled by the contact pin 64.

Therefore, since the rotation roller 50 is moveable within the notch 51b and the movement beyond this notch 51b is prevented by the contact pin 64, the position of the finger mechanism 20 is suitably limited, even when the finger mechanism 20 was forcibly flexed or stretched, e.g. by a person.

Here, the finger mechanism 20 (the rotation roller 50) backs to a home position by the spring member 63, if a person unlink the hand after bending forcibly the finger mechanism 20.

Furthermore, the notch 51b and contact pin 64 of above described embodiment provide following benefits.

When grasping a comparatively heavy member (target object) put on the finger mechanism 20, for example, the rotation roller 50 held by the spring member 63 tries to rotate together with the rotation axis 61, if the rotation axis 61 begins to rotate by the actuation of the motor 30.

In this case, since the flexing motion of the finger mechanism 20 is disturbed by the target object, the rotation axis 61 rotates while deforming the spring member 63, without the rotation of the rotation roller 50.

That is, since the rotation axis 61 causes a relative rotation with respect to the rotation roller 50, the contact pin 64 disposed on the rotation axis 61 begins to approach the edge of the notch 51b as the rotation proceeds.

Then, since the rotation roller 50 is pushed by the contact pin 64 with a strong force and begins to turn when the contact pin 64 of the rotation axis 61 contacts with the edge of the notch 51b, the gripping of the target object can be achieved even if the target object is a comparatively heavy member.

As shown in FIG. 4, additionally, a spring reception-part 51d and 51e, which elongates in an outside along an axial direction, is provided on both end surfaces 51a and 51c of the rotation base 51, respectively.

In this embodiment, as shown in FIG. 4, since the spring reception-part 51d and 51e is provided on both end surfaces 51a and 51c of the rotation base 51, the position with respect to the rotation roller 50 of the spring member 63 is suitably selectable. Thereby, the freedom in the design is improved and the shape of all of the rotation rollers 50 can be the same shape, and thus the manufacturing cost can be reduced by just that much.

As shown in FIG. 2A, the link mechanism 40 is essentially composed of a first-arm 41, a v-shaped arm 42, and a second-arm 43. The first-arm 41 rotatably connects with one end of the v-shaped arm 42 and the tip of the elongation part 52 of the rotation roller 50.

Both ends of the v-shaped arm 42 rotatably connect with the first-arm 41 and a fixation pin 44 fixed to the frame F (see FIG. 1). The second-arm 43 rotatably connects with v-shaped arm 42 at a suitable position in a middle of the v-shaped arm 42.

One end of the second-arm 43 that is not connected to the v-shaped arm 42 rotatably connects with the base-side member 21 of the finger mechanism 20 through the pin P1.

In the link mechanism 40 having these constructions, as shown in FIG. 2B, when the rotation roller 50 turns in a direction shown by arrow C1 together with the rotation axis 61, the first-arm 41 is pulled in a direction shown by arrow C2 and thus the v-shaped arm 42 turns in a direction shown by arrow C3 around the fixation pin 44.

Thereby, the second-arm 43 is pulled in a direction shown by arrow C4 as a result of the rotation in a direction shown by arrow C3 of the v-shaped arm 42, and thus the finger mechanism 20 is flexed as a result of the actuation in each direction shown by the arrows A1 to A8.

Here, the direction of each arrow C1-C4 used in the above-described explanation is the direction when bending the finger mechanism 20. The direction of each arrow C1-C4 becomes inverse direction when stretching the finger mechanism 20.

Figure 6:
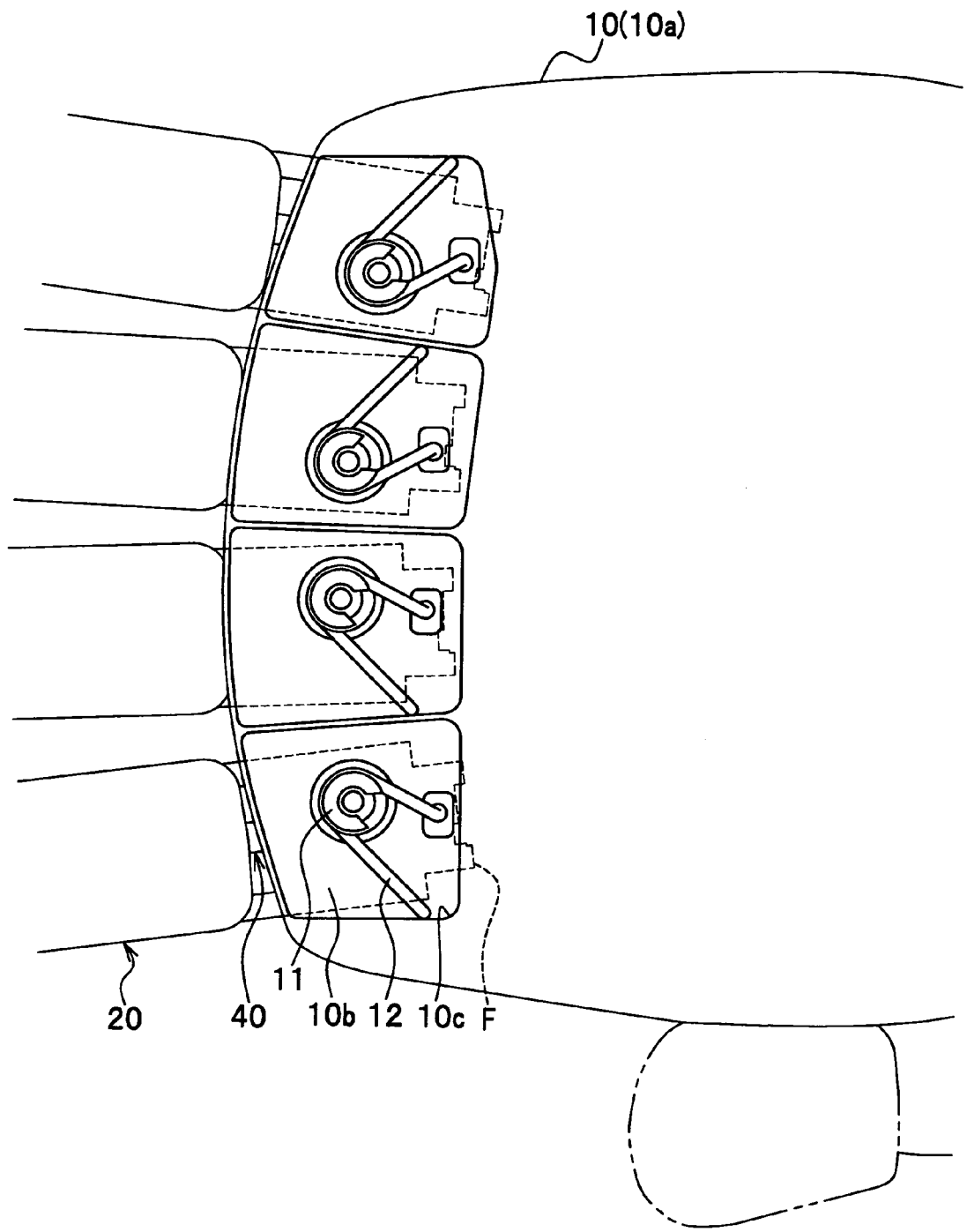
FIG. 6 is a bottom plane view showing the supporting structure supporting the finger mechanism while allowing the pivot in a side direction.

The link mechanism 40, as shown in FIG. 6, is adapted to pivot in a sideward direction, within the plane of the opisthenar section 10a, around a shaft 11 provided on the base 10. Thereby, the pivot in a sideward direction, i.e. a mutual motion between adjoining finger mechanisms, of the finger mechanism 20 can be enabled.

To be more precise, as shown FIG. 1 to FIG. 4, the frame F, to which the fixation pin 44 for supporting the v-shaped arm 42 of the link mechanism 40 and the third joint member 24 for supporting the base-side member 21 of the finger mechanism 20 are fixed, is supported by the base 10 while allowing the swing motion in a sideward direction.

Furthermore, as shown in FIG. 6, the finger mechanism 20 to be fixed to the frame F is pushed by the positioning spring 12 (base-side elastic device) attached to the shaft 11 in a direction apart from the adjoining finger mechanism.

One end of the spring 12 is hooked with the recessed part 10c of the concave part 10b of the opisthenar section 10a, and the other end of the positioning spring 12 is fixed to the frame F.

As shown in FIG. 4, since the frame F is pivotable, a space is provided on the joint J1 between the v-shaped arm 42 and the first-arm 41 of the link mechanism 40 and the joint J2 between the first-arm 41 and the rotation roller 50.

Figure 7:
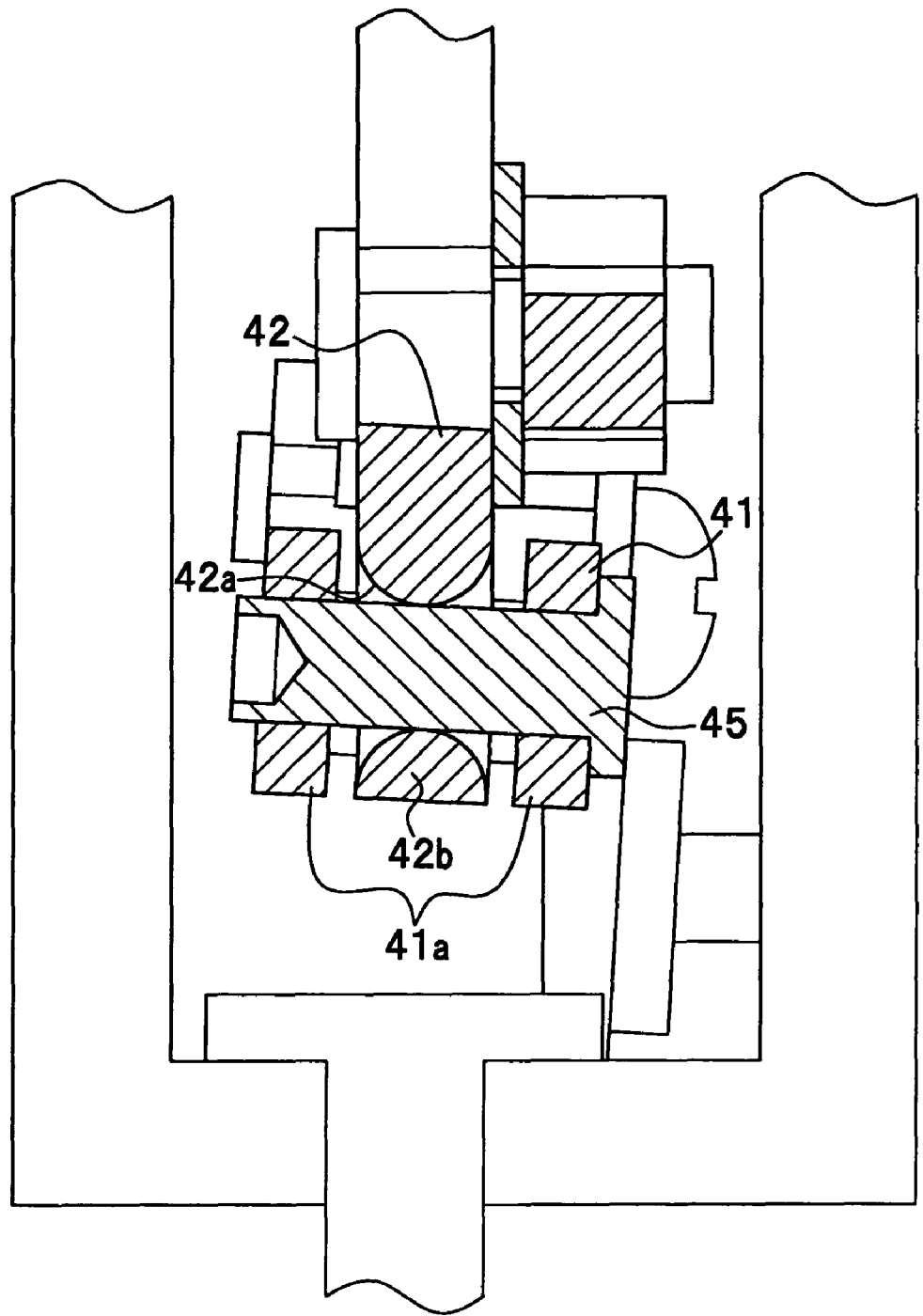
FIG. 7 is a sectional view along line X-X.

To be more precise, the joint J1, as shown in FIG. 7, consists of a forked part 41a formed on one end of the first-arm 41, a pin 45 fixed to this forked part 41a, and an end part 42b of the v-shaped arm 42. The end part 42b is disposed between the forked part 41a with a predetermined interval and is provided with a through hole 42a through which the pin 45 is passed.

The smooth displacement in a sideward direction of the first-arm 41 and v-shaped arm 42 is enabled, by establishing the diameter of the through hole 42a so that the diameter of the through hole 42a becomes gradually wide from the center of the end part 42b to the outside. Here, the joint J2 has the same construction as the joint J1.

In this embodiment, the joint J1 and the joint J2 has the same construction, but the embodiment of the present invention is not limited to the above-described construction. For example, a ball joint may be adopted instead of the joint of the above-described embodiment.

As described above, the finger mechanism 20 and the link mechanism 40 connect with the base 10 through the frame F while allowing the pivot with respect to the base 10. Thereby, since each finger mechanism 20 can pivot when robot hand apparatus 1 shakes a hand with a person, the occurrence of the breakage of each finger mechanism 20 can be prevented, even if a person grabs with strong force so that four finger mechanisms (index, middle, ring, litter) are contacted each other.

Furthermore, each finger mechanism 20 is automatically moved to the home position by a positioning spring 12, after finishing a shake hand between the person and the robot hand apparatus 1.

Next, the motion of the finger mechanism 20 will be explained. In the following explanation, as shown in FIG. 1, the motion from the maximum stretch state to the maximum grip state of the finger mechanism 20 will be explained. The reverse motion from the maximum grip state to the maximum stretch state will be omitted.

Firstly, as shown in FIG. 1, when the motor 30 is actuated, the power from the motor 30 is transferred to the rotation axis 61 through the reduction unit 31 and the motor side link mechanism 32. Then, the rotation axis 61 begins to rotate in an anti-clockwise direction (see arrow B1 to B4 of FIG. 3).

When the rotation axis 61 begins to rotate, as shown in FIG. 5, each rotation roller 50 begin to rotate together with the rotation axis 61, from the rotation roller 50 whose degree of deformation becomes zero. That is, each rotation roller 50 begin to rotate together with the rotation axis 61, from the rotation roller 50 for a little.

Then, as shown in FIG. 1, each finger mechanism 20 is flexed by each link mechanism 40, in order, from the finger mechanism 20 for a little to the finger mechanism 20 for an index, when each rotation roller 50 begins to rotate in order from the rotation roller 50 for a little.

In this embodiment, as described above, the benefits as follows can be obtained. Since the degree of the deformation of each spring member 63 becomes zero in order from the spring member 63 for a little finger when the flexing of the finger mechanism 20 in a maximum stretch state is started, each rotation roller 50 begins to rotate in order from the rotation roller 50 for a little finger. Therefore, a humanlike grip motion, i.e. the motion to bend each finger one by one from a little finger (little) to an index finger (index) can be achieved.

Additionally, since the power transmission mechanism 60 mainly consists of the rotation axis 61, which does not shift to the other space, and the spring member 63 provided on the rotation axis 61, the improvement of the space efficiency can be enabled.

According to the mechanism of the present invention, since finger mechanism 20 is pulled/pushed by the link mechanism 40, the base-side member 21 of the finger mechanism 20 can be aggressively pushed by the link mechanism 40 when stretching the finger mechanism than the conventional mechanism, in which the flexing and stretching of the finger mechanism is achieved by changing the pulling direction of the wiring being put around the part of the finger mechanism. Thereby, the flex and stretch of the finger mechanism 20 can be achieved sufficiently.

Since the rotation roller 50 begins to rotate while receiving a force forcefully given by the contact pin 64 of the rotation axis 61 when griping a comparatively heavy member (target object) put on the finger mechanism 20, the flexing of the finger mechanism 20 can be achieved. Thereby, the sufficient grip of the comparative heavy member can be enabled.

When robot hand apparatus 1 shakes a hand with a person, since each finger mechanism 20 can pivot, the occurrence of the breakage of each finger mechanism 20 can be prevented, even if a person grabs with strong force so that four finger mechanisms (index, middle, ring, litter) are contacted each other.

Furthermore, after finishing a shake hand between the person and the robot hand apparatus, each finger mechanism 20 is automatically moved to the home position by a positioning spring 12.

In this embodiment, the relative rotation of each rotation roller 50 to rotation axis 61 is allowed within the limited range defined by both ends of the notch 51b in which the contact pin 64 is moveable. Therefore, when griping an object having a complicated shape by the robot hand apparatus 1, the rotation axis 61 can rotate, within the limited range, with regard to a little (the rotation roller 50 of a little side), even if the rotation of one of four finger mechanisms 20, e.g. the finger mechanism of a little, is forbidden by the contact with the object.

Thereby, since the rotation roller 50 of other finger mechanism, i.e. finger mechanism of an index, middle, and ring, rotates together with the rotation axis 61 within the limited range, an appropriate grip of an object can be achieved by fitting all of finger mechanism 20 with the object.

Additionally, the present invention can be represented by various embodiments, and is not limited to the above described embodiment.

In the above-described embodiment, the motor 30 which serves an power source and only rotates the output shaft is adopted. But the present invention is not limited to this embodiment, for example, a stepping motor or a piston that moves the output shaft in a forward and backward direction along axial direction may be adoptable.

In this embodiment, power from a single power source is transferred to each of four finger mechanism 20 (little, ring, middle, and index) at a different timing. But the present invention is not limited to this, it is preferable that the power from the power source is supplied to at least two of these finger mechanisms at different timing.

What is claimed is:

1. A robot hand apparatus, comprising:
   a plurality of finger mechanisms each elongates from a base;
   a power source actuating each finger mechanism;
   a plurality of finger mechanism actuation units for actuating each finger mechanism; and
   a power transmission mechanism transmitting a power from the power source to at least two of said plurality of finger mechanisms at different timing,
   wherein the power source is a motor,
   the finger mechanism actuation unit is a rotation roller which connects with the finger mechanism through a transmission unit,
   the power transmission mechanism comprises
   a rotation axis which supports each rotation roller while allowing the rotation of the rotation roller and is rotated by the motor, and
   elastic devices, each is fixed to the rotation axis for holding the rotation roller at a predetermined position on the rotation axis, wherein
   each rotation roller rotates together with the rotation axis when the rotation roller is held at a predetermined position on the rotation axis by the elastic device, and wherein
   the degree of the deformation of each of elastic devices differs each other, when the finger mechanism is in a maximum grip state or in a maximum stretch state.

2. A robot hand apparatus according to claim 1, wherein the transmission unit is a link mechanism.

3. A robot hand apparatus according to claim 1, wherein a plurality of contact-parts, each engages with and separates from a part of the corresponding rotation roller, are provided on the rotation axis.

4. A robot hand apparatus according to claim 3, wherein each finger mechanism is supported while allowing the turn in an approaching-and-separating direction with regard to the adjoining finger mechanism around a base-side section of the finger mechanism.

5. A robot hand apparatus according to claim 4, wherein the finger mechanism is held by an elastic device fixed to the base, and the finger mechanism is pushed by the elastic device in a direction apart from the adjoining finger mechanism.

6. A robot hand apparatus according to claim 3, wherein the finger mechanism is held by an elastic device fixed to the base, and the finger mechanism is pushed by the elastic device in a direction apart from the adjoining finger mechanism.

7. A robot hand apparatus according to claim 1, wherein each finger mechanism is supported while allowing the turn in an approaching-and-separating direction with regard to the adjoining finger mechanism around a base-side section of the finger mechanism.

8. A robot hand apparatus according to claim 7, wherein the finger mechanism is held by an elastic device fixed to the base, and the finger mechanism is pushed by the elastic device in a direction apart from the adjoining finger mechanism.

9. A robot hand apparatus according to claim 1, wherein the finger mechanism is held by an elastic device fixed to the base, and the finger mechanism is pushed by the elastic device in a direction apart from the adjoining finger mechanism.

* * * * *